US012803223B2

(12) United States Patent
Nozaki et al.

(10) Patent No.: US 12,803,223 B2
(45) Date of Patent: Nov. 17, 2026

(54) CONNECTOR WITH POSITION ASSURANCE MEMBER FOR FORMING COMPOSITE IDENTIFIER

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Shinji Nozaki, Mie (JP); Hideto Nakamura, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 346 days.

(21) Appl. No.: 18/691,304

(22) PCT Filed: Sep. 8, 2022

(86) PCT No.: PCT/JP2022/033665

§ 371 (c)(1),
(2) Date: Mar. 12, 2024

(87) PCT Pub. No.: WO2023/047964

PCT Pub. Date: Mar. 30, 2023

(65) Prior Publication Data

US 2024/0380166 A1 Nov. 14, 2024

(30) Foreign Application Priority Data

Sep. 24, 2021 (JP) ................................ 2021-155533

(51) Int. Cl.
*H01R 13/436* (2006.01)
*H01R 13/641* (2006.01)

(52) U.S. Cl.
CPC ................................. *H01R 13/641* (2013.01)

(58) Field of Classification Search
CPC ............................ H01R 13/641; H01R 13/465
See application file for complete search history.

(56) References Cited

U.S. PATENT DOCUMENTS

2017/0214168 A1* 7/2017 Schroll .............. H01R 13/4365
2017/0229813 A1 8/2017 Exenberger et al.
(Continued)

OTHER PUBLICATIONS

International Search Report issued on Dec. 6, 2022 for WO 2023/047964 A1 (4 pages).

*Primary Examiner* — Abdullah A Riyami
*Assistant Examiner* — Nelson R. Burgos-Guntin

(57) ABSTRACT

A connector 1 includes: a housing 10 that can fit together with a partner connector 70; a CPA member 50 that is to be attached to the housing 10 and can be displaced between a standby position and a fitting assurance position; a first two-dimensional code 60A arranged so as to be visible on an outer surface of the housing 10; and a second two-dimensional code 60B arranged so as to be visible on an outer surface of the CPA member 50. When the CPA member 50 is in the fitting assurance position, the first two-dimensional code 60A and the second two-dimensional code 60B are separated from each other, and when the CPA member 50 is in the standby position, the first two-dimensional code 60A and the second two-dimensional code 60B combine to form a composite two-dimensional code 60C.

4 Claims, 16 Drawing Sheets

(56) References Cited

U.S. PATENT DOCUMENTS

| | | | | |
|---|---|---|---|---|
| 2019/0372262 | A1* | 12/2019 | Christiano | H01R 13/465 |
| 2020/0153159 | A1 | 5/2020 | Gartenmaier | |
| 2021/0111519 | A1* | 4/2021 | Schneider | H01R 13/465 |

* cited by examiner

CONNECTOR WITH POSITION ASSURANCE MEMBER FOR FORMING COMPOSITE IDENTIFIER

CROSS REFERENCE TO RELATED APPLICATIONS

This application is a national phase of PCT application No. PCT/JP2022/033665, filed on 8 Sep. 2022, which claims priority from Japanese patent application No. 2021-155533, filed on 24 Sep. 2021, all of which are incorporated herein by reference.

TECHNICAL FIELD

The technique disclosed herein relates to a connector.

BACKGROUND

Conventionally, connectors are known that have a fitting detection function for detecting whether or not a male housing and a female housing are properly fitted together. Such connectors include, for example, a connector housing, a lever that assists in fitting together the connector housing and a partner connector, a position assurance lock that can be displaced from a released position to an engaged position when the lever is in a fitting completion position, and an identifier attached to the connector housing. The identifier is covered by the position assurance lock when the position security lock is in the released position and is exposed from the position assurance lock when the position assurance lock is in the engaged position, and is accessible by a reading device or the like. By accessing the exposed identifier, completion of fitting between the connector housing and the partner connector is detected and recorded.

PRIOR ART DOCUMENT

Patent Document

Patent Document 1: JP 2017-162797 A

SUMMARY OF THE INVENTION

Problems to be Solved

In the above configuration, when the position assurance lock is in the released position, the entire identifier is covered, and therefore a worker performing a connector fitting task may not know where the identifier is and become confused, resulting in a decrease in work efficiency.

Means to Solve the Problem

The connector disclosed herein includes: a housing capable of fitting together with a partner connector; an attachment member that is to be attached to the housing and is capable of being displaced between a first position and a second position; a first identifier arranged so as to be visible on an outer surface of the housing; and a second identifier arranged so as to be visible on an outer surface of the attachment member, in which when the attachment member is in one of the first position and the second position, the first identifier and the second identifier combine to form a composite identifier, and when the attachment member is in another of the first position and the second position, the first identifier and the second identifier are separated from each other.

Effect of the Invention

According to the connector disclosed in this specification, it is possible to achieve both reliable detection of completion of fitting with a partner connector and improvement of work efficiency.

DETAILED DESCRIPTION TO EXECUTE THE INVENTION

Figure 1:
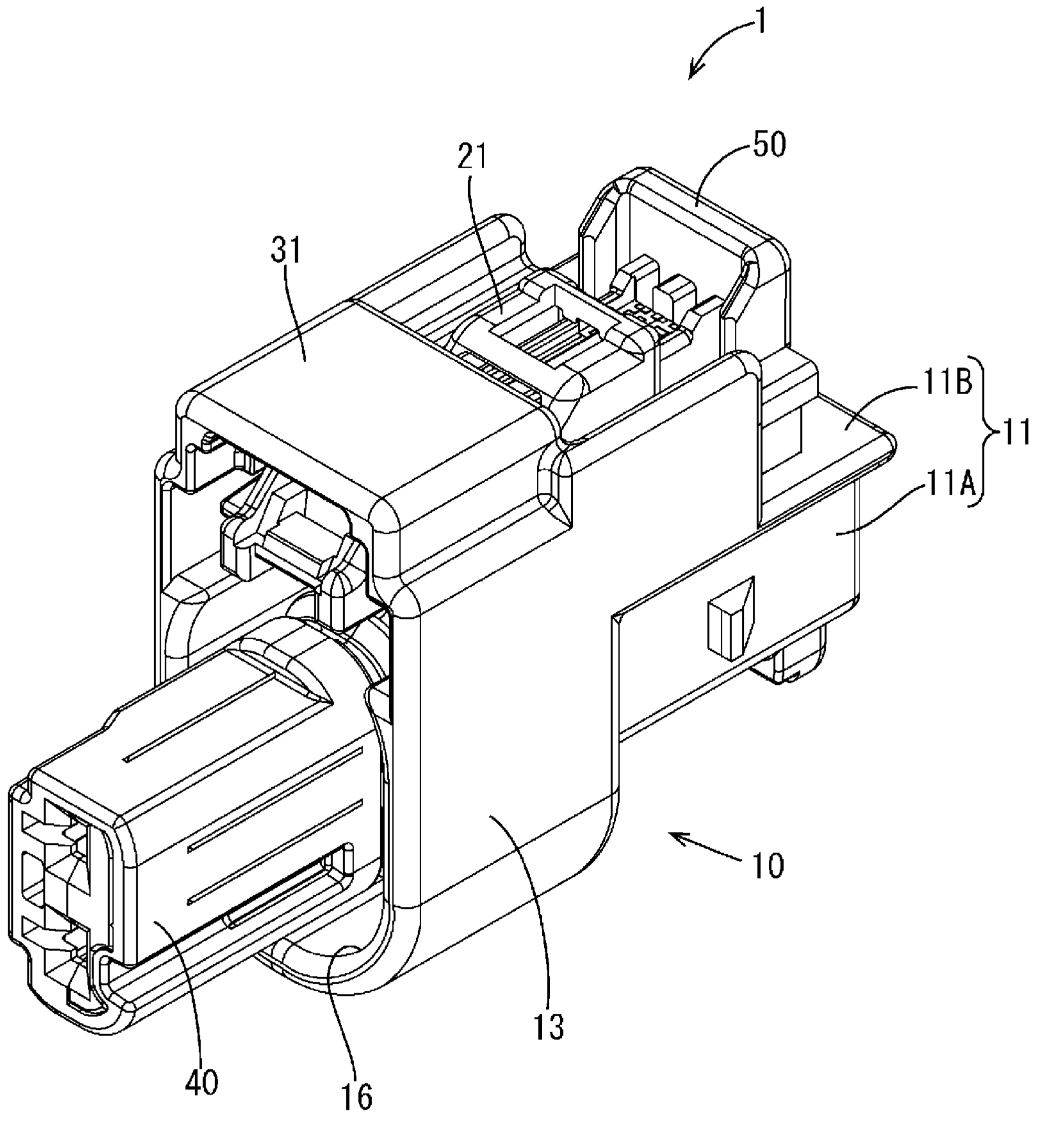
FIG. 1 is a perspective view of a connector according to an embodiment.

Summary of Embodiments (1) The connector disclosed herein includes: a housing capable of fitting together with a partner connector; an attachment member that is to be attached to the housing and is capable of being displaced between a first position and a second position: a first identifier arranged so as to be visible on an outer surface of the housing: and a second identifier arranged so as to be visible on an outer surface of the attachment member, in which when the attachment member is in one of the first position and the second position, the first identifier and the second identifier combine to form a composite identifier, and when the attachment member is in another of the first position and the second position, the first identifier and the second identifier are separated from each other.

According to the above-described configuration, the attachment member is attached to the housing in the first position, and after the housing is fitted together with the partner connector, the attachment member can be displaced to the second position relative to the housing. Also, when the attachment member is in one of the first position and the second position, the two identifiers combine to form the composite identifier, and when the attachment member is in the other position, the first identifier and the second identifier are separated from each other. As a result, by detecting whether the two identifiers are separated or have combined to form a composite identifier, it is possible to detect whether or not the fitting of the housing together with the partner connector is complete. Also, since the first identifier and the second identifier are arranged so as to be visible, the worker can perform work while visually confirming these identifiers. As described above, it is possible to achieve both reliable detection of completion of fitting together with the partner connector and improvement of work efficiency.

(2) In the connector according to (1) above, the attachment member may be a fitting assurance member capable of being displaced from the first position to the second position only when the housing is completely fitted together with the partner connector.

According to such a configuration, since the attachment member is the fitting assurance member, it is possible to assure that the fitting is complete by being able to move the fitting assurance member from the first position to the second position.

(3) In the connector of (1) or (2) above, one of the housing and the attachment member may include a separating portion that separates the first identifier and the second identifier from each other when the attachment member is in the other of the first position and the second position.

According to such a configuration, when the attachment member is in the other of the first position and the second position, the first identifier and the second identifier are reliably separated from each other, and it is possible to reliably avoid a situation in which the first identifier and the second identifier are erroneously recognized as being combined.

Details of Embodiments

A specific example of the technique disclosed in this specification will be described below with reference to FIGS. 1 to 16. Note that the present invention is not limited to these examples, but is indicated by the scope of the claims, and all changes that fall within the meaning and scope equivalent to the scope of the claims are intended to be encompassed therein.

Overall Structure of Connector 1

Figure 2:
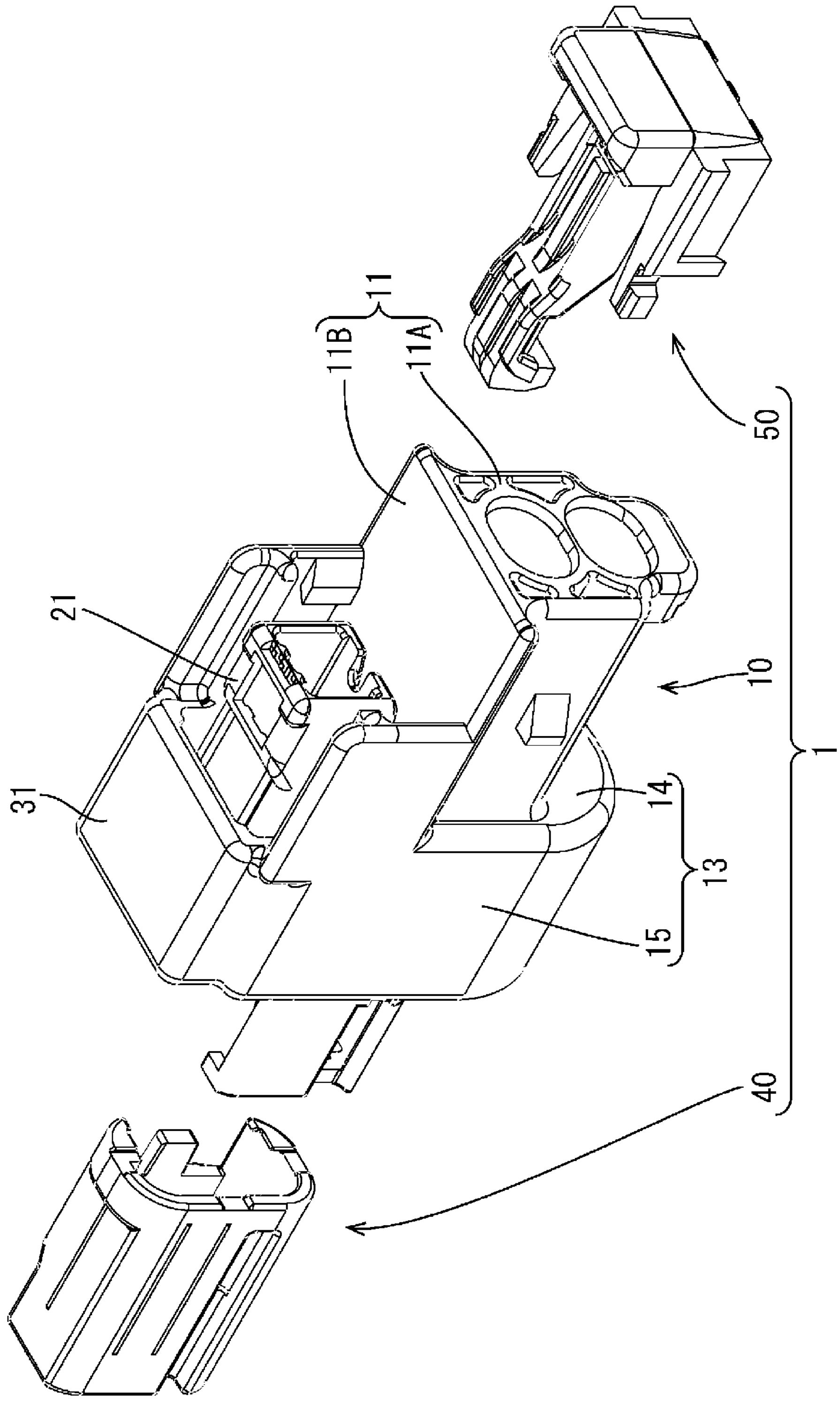
FIG. 2 is an exploded perspective view of the connector according to the embodiment.

As shown in FIGS. 1 and 2, a connector 1 of the embodiment includes a housing 10 that includes a CPA holding portion 31 and is fitted together with a partner connector 70, a front holder 40 that is to be attached to the housing 10, and a CPA (connector position assurance) member 50 (an example of an attachment member, a fitting assurance member) that is to be attached to the CPA holding portion 31 to assure the fitted state of the connector 1 and the partner connector 70. In the following description, the direction in which the connector 1 and the partner connector 70 are fitted together (the left-right direction in FIG. 10) is referred to as the front-rear direction, and the side on which the partner connector 70 is attached (the left side in FIG. 10) is referred to as the front side.

Housing 10

The housing 10 is made of synthetic resin, and includes a terminal accommodation portion 11, a hood portion 13, a lock arm 21, and a CPA holding portion 31, as shown in FIGS. 1 and 2.

Figure 3:
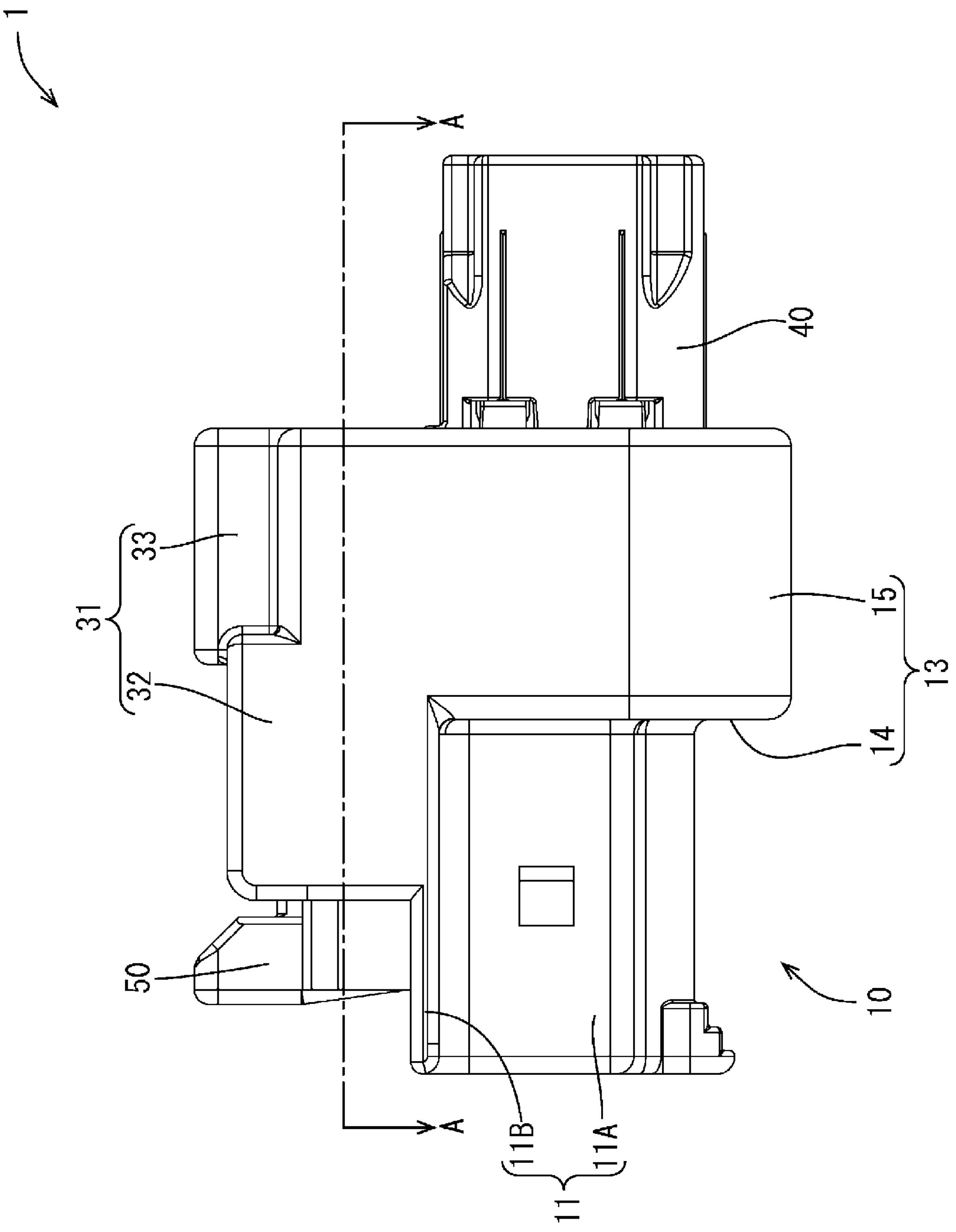
FIG. 3 is a side view of the connector according to the embodiment.
Figure 5:
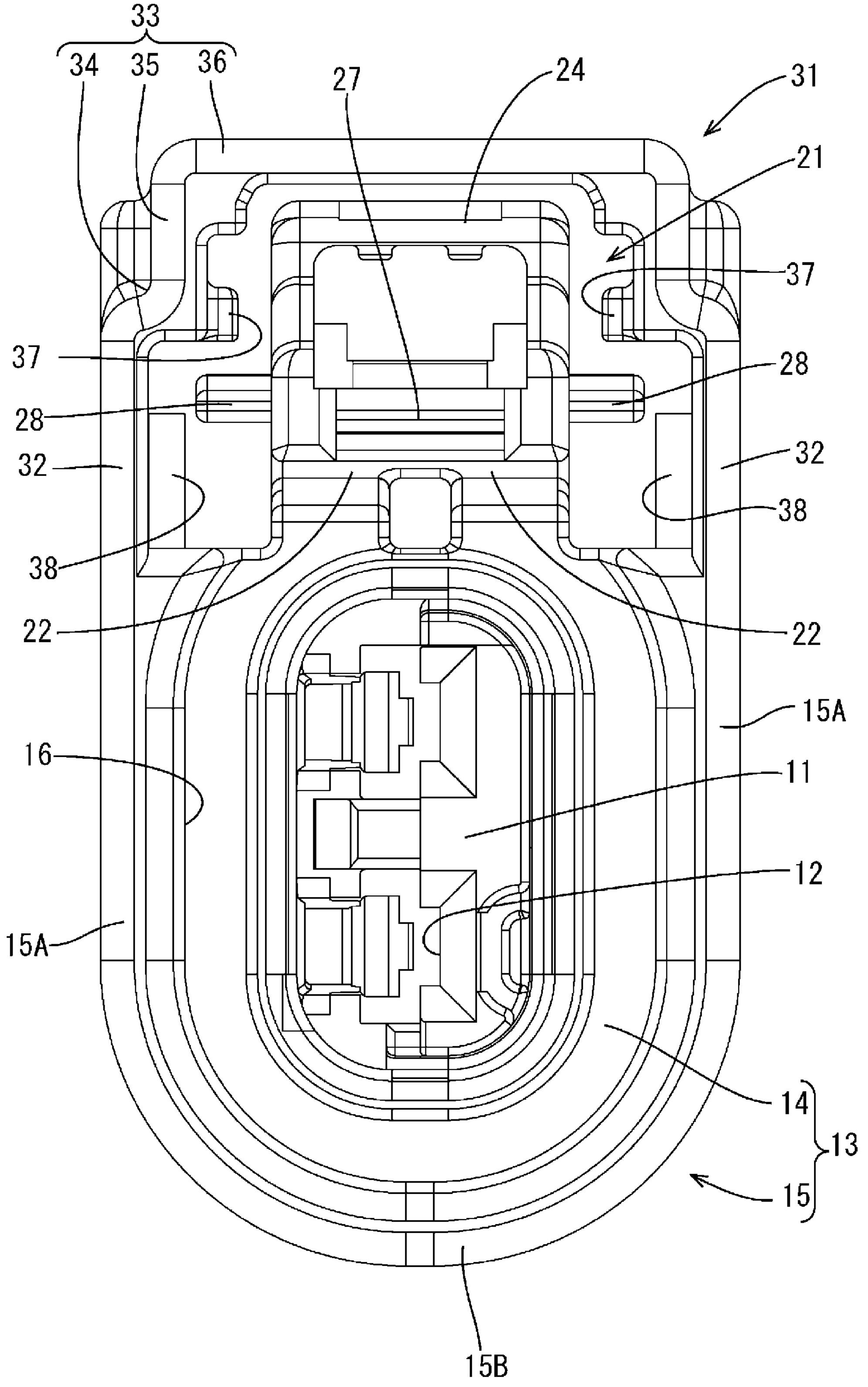
FIG. 5 is a front view of a housing according to the embodiment.
Figure 11:
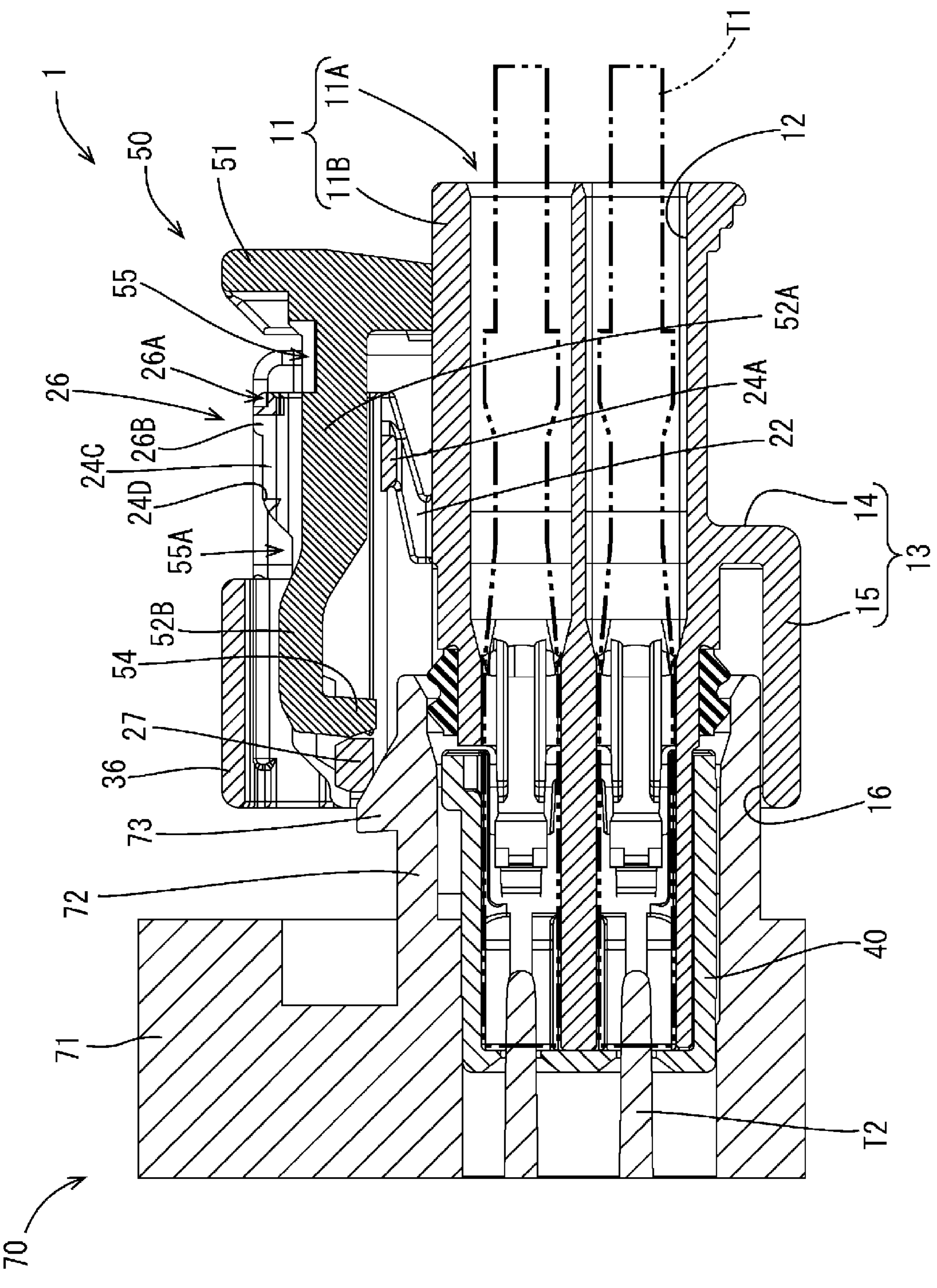
FIG. 11 is a cross-sectional view taken along line B-B in FIG. 10.
Figure 12:
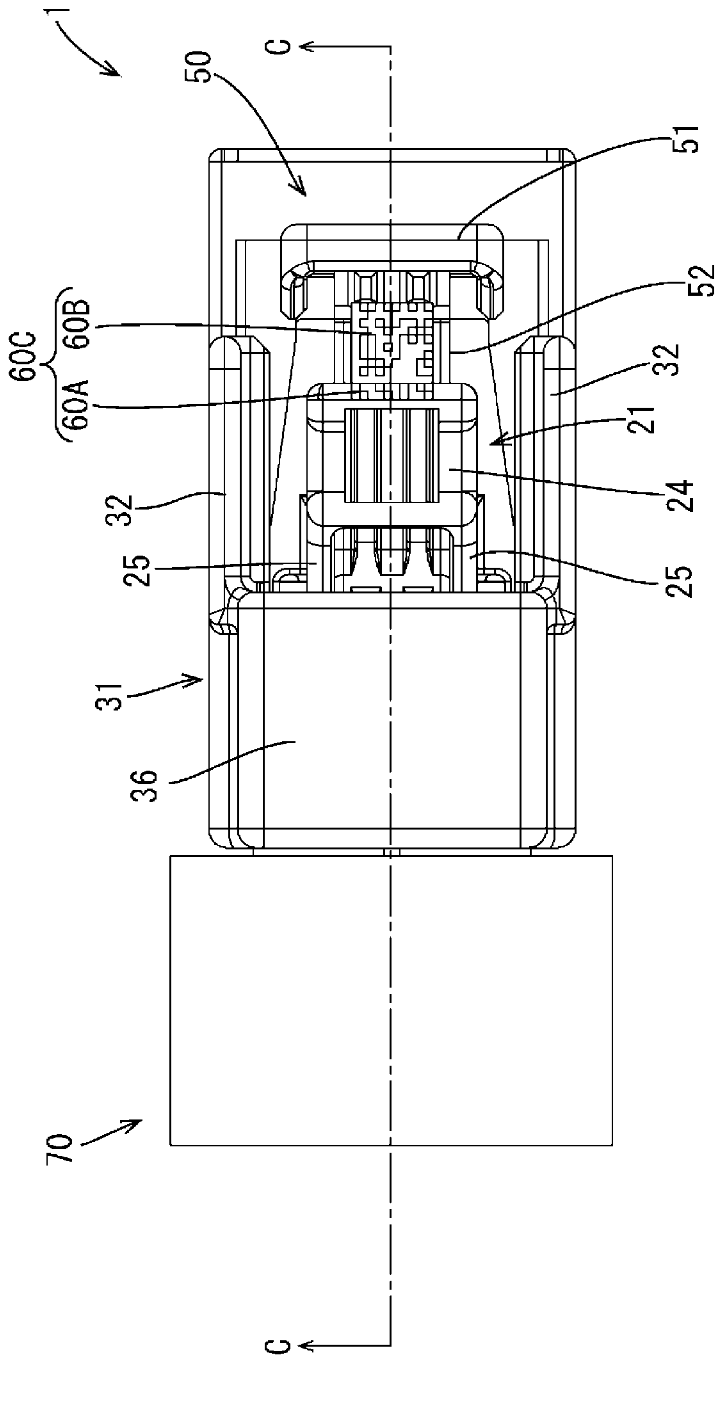
FIG. 12 is a plan view showing a state in which fitting between the connector and the partner connector according to the embodiment is complete and the CPA member is in a standby position.

The terminal accommodation portion 11 includes an accommodation portion main body 11A having an elongated block shape extending in the front-rear direction, and a holding wall 11B disposed along the accommodation portion main body 11A. As shown in FIGS. 5 and 11, the accommodation portion main body 11A has a plurality of cavities 12 inside of which female terminal fittings T1 can be accommodated. As shown in FIGS. 2, 5, and 11, the hood portion 13 includes a back wall 14 extending outward from the outer peripheral surface of the accommodation portion main body 11A, and a peripheral wall 15 extending frontward from the back wall 14 and surrounding the accommodation portion main body 11A. As shown in FIG. 5, the peripheral wall 15 includes hood side walls 15A disposed on both sides of the terminal accommodation portion 11 and a half-pipe-shaped hood bottom wall 15B that connects the two hood side walls 15A, and the peripheral wall 15 is U-shaped overall and has a fitting port 16 that allows the partner connector 70 to enter. As shown in FIGS. 2 and 3, the holding wall 11B is a flat wall disposed rearward of the back wall 14 and along the accommodation portion main body 11A, and is disposed perpendicular to the two hood side walls 15A.

The terminal accommodation portion 11 includes a portion that protrudes frontward from the hood portion 13, and a front holder 40 for preventing the female terminal fittings T1 from coming off is attached to this protruding portion.

Lock Arm 21

Figure 6:
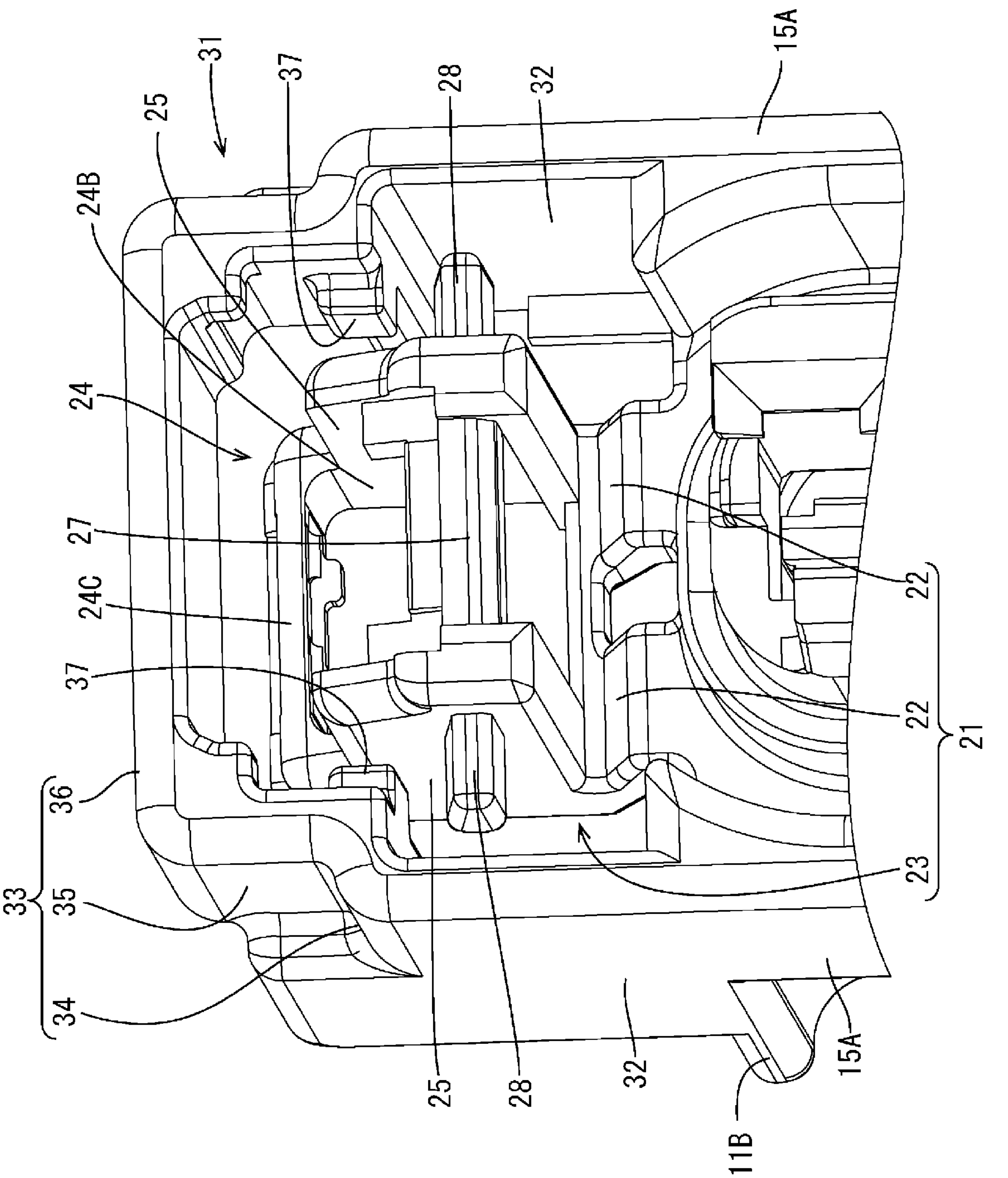
FIG. 6 is a partial enlarged perspective view of the housing according to the embodiment.
Figure 7:
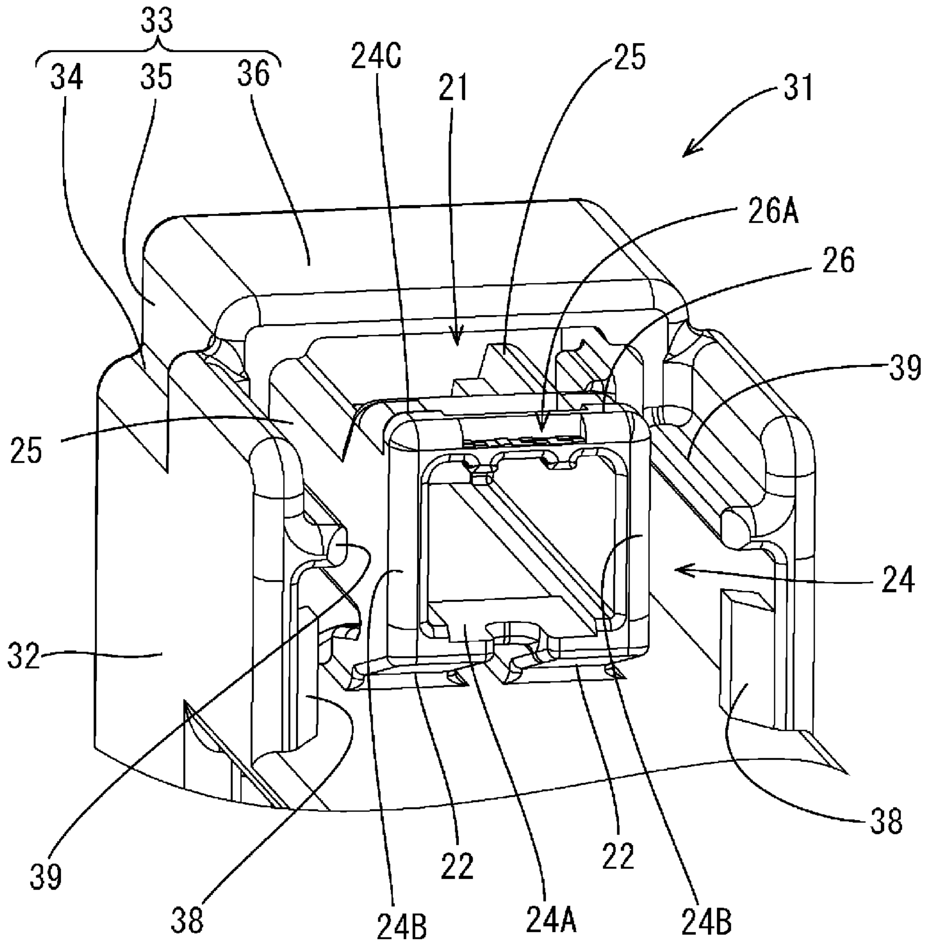
FIG. 7 is a partial enlarged perspective view showing the housing according to the embodiment from a direction different from that of FIG. 6.

As shown in FIGS. 6 and 7, the lock arm 21 includes two lock base portions 22 and a lock main body 23.

As shown in FIGS. 6 and 11, the two lock base portions 22 each have a leaf spring shape and extend obliquely from the holding wall 11B so as to be farther away from the holding wall 11B toward the rear. The two lock base portions 22 are disposed side by side.

As shown in FIGS. 6 and 7, the lock main body 23 includes a receiving tube portion 24, two lock side walls 25, a locking portion 27, and two bending restricting pieces 28.

Figure 8:
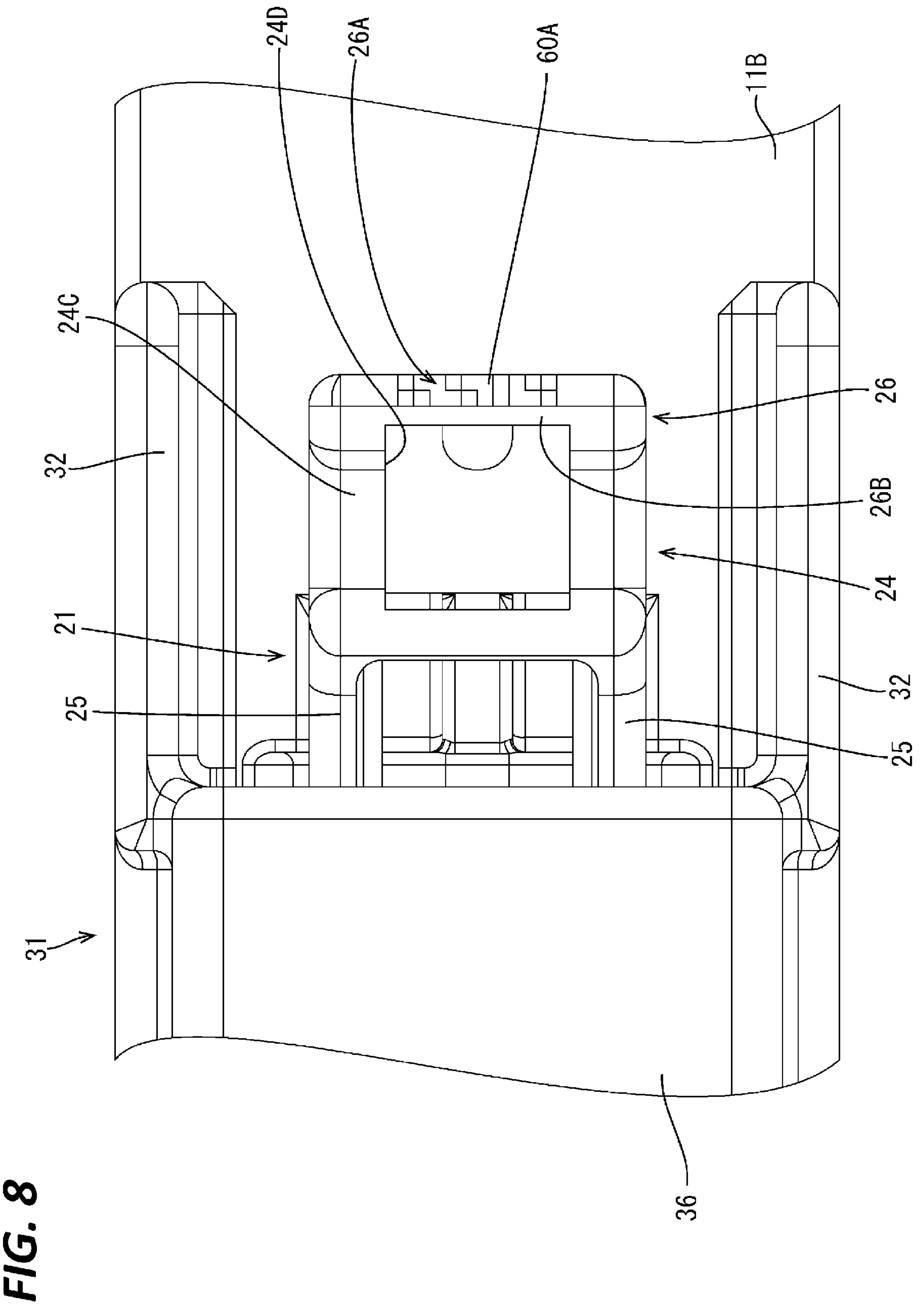
FIG. 8 is a partial enlarged plan view of the housing according to the embodiment.

As shown in FIGS. 7 and 11, the receiving tube portion 24 has a rectangular tube shape, and includes a receiving bottom wall 24A continuous with the rear ends of the two lock base portions 22, two receiving side walls 24B standing upright from both side edges of the receiving bottom wall 24A, a receiving top wall 24C that connects the two receiving side walls 24B and is disposed facing the receiving bottom wall 24A, and a strip-shaped lock operation portion 26 disposed along the rear edge of the receiving top wall 24C. As shown in FIG. 8, the receiving top wall 24C has a viewing window 24D at a position adjacent to the lock operation portion 26. As shown in FIG. 8, the receiving tube portion 24 has a first code arrangement surface 26A disposed at the rear end of the lock operation portion 26. The front half of the lock operation portion 26 located between the first code arrangement surface 26A and the viewing window 24D is a separating portion 26B that separates the first code arrangement surface 26A and the viewing window 24D from each other.

As shown in FIG. 7, the two lock side walls 25 each extend frontward from the two receiving side walls 24B and are arranged facing each other. As shown in FIG. 6, the locking portion 27 has a rod shape and is installed spanning between the two lock side walls 25. One of the two bending restricting pieces 28 protrudes outward from one lock side wall 25, and the other protrudes outward from the other lock side wall 25.

The lock arm 21 can be displaced in the direction toward or away from the terminal accommodation portion 11 due to the lock bases 22 bending in the direction toward or away from the holding wall 11B.

CPA Holding Portion 31

As shown in FIGS. 5, 6, and 7, the CPA holding portion 31 includes two protective side walls 32, a connecting wall 33 that connects the two protective side walls 32, two bending restricting protrusions 37, two holding protrusions 38, and two side ribs 39.

The two protective side walls 32 are disposed on both sides of the lock arm 21, perpendicular to the holding wall 11B, and facing each other. One protective side wall 32 is connected to one end of the peripheral wall 15 and one of the two side edges of the holding wall 11B, and the other protective side wall 32 is connected to the other end of the peripheral wall 15 and the other side edge of the holding wall 11B. The connecting wall 33 is a wall that connects the two protective side walls 32, and includes two stepped portions 34 respectively extending inward from the two protective side walls 32, two upright walls 35 that respectively stand upright from the extension ends of the two stepped portions 34 and are disposed on both sides of the lock arm 21, and a protective top wall 36 that connects the two upright walls 35 and is disposed facing the holding wall 11B. The connecting wall 33 covers approximately the front half of the lock arm 21, and protects the lock arm 21 by restricting unintentional deformation of the lock arm 21. Note that the receiving tube portion 24, which is disposed at the rear end of the lock arm 21 and has the viewing window 24D and the first code arrangement surface 26A, is not covered by the protective top wall 36 and is disposed so as to be visible from the outside.

The two bending restricting protrusions 37 are projections that respectively protrude inward from the two upright walls 35, as shown in FIG. 6. If the lock arm 21 attempts to bend excessively, the two bending restricting pieces 28 come into contact with the two bending restricting protrusions 37, thereby restricting further bending of the lock arm 21 and avoiding breakage of the lock arm 21.

The two holding protrusions 38 are projections that respectively protrude inward from the rear edges of the two protective side walls 32, as shown in FIGS. 5 and 7. The two side ribs 39 are strip-shaped protrusions that respectively protrude from the two protective side walls 32 and extend in the front-rear direction, and are disposed rearward of the connecting wall 33.

CPA Member 50

Figure 9:
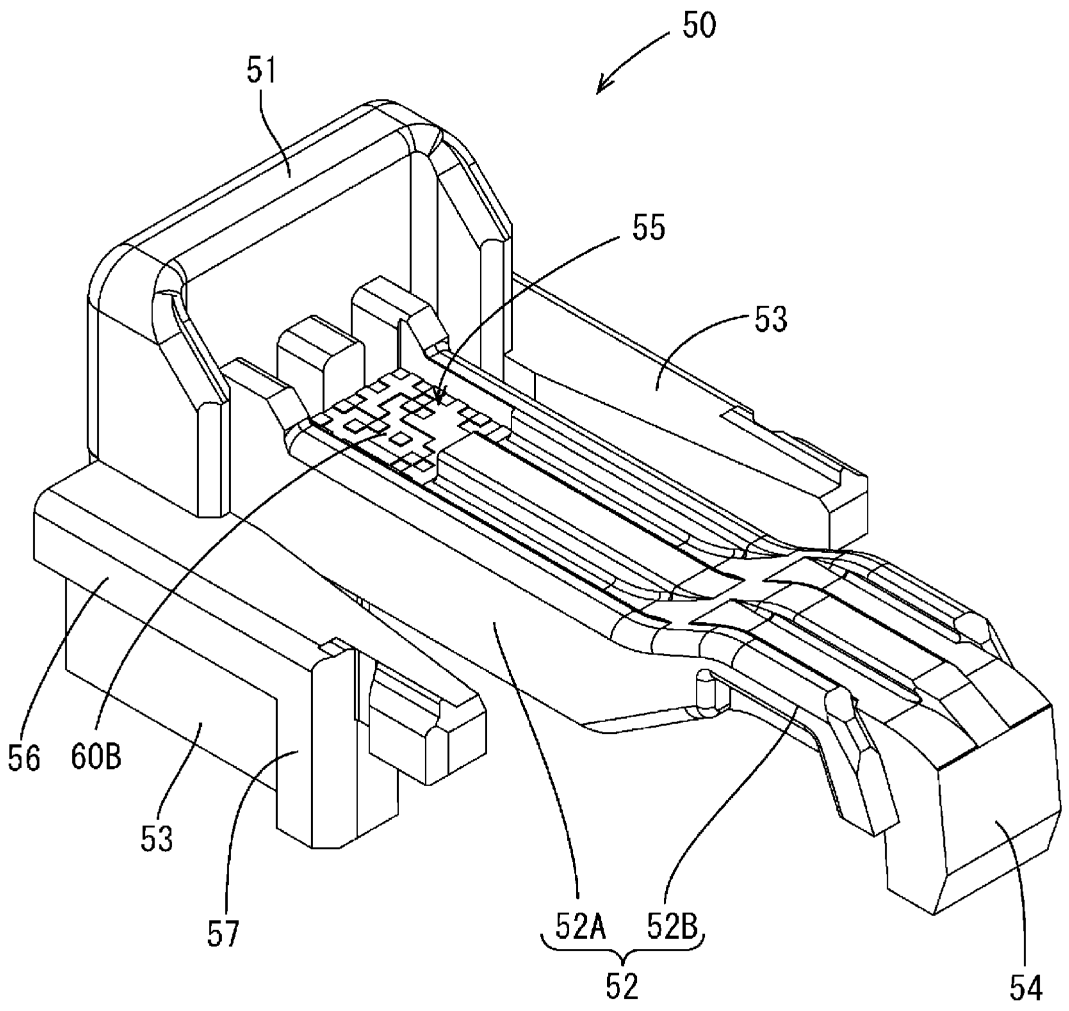
FIG. 9 is a perspective view of a CPA member according to the embodiment.

The CPA member 50 is made of synthetic resin, and as shown in FIG. 9, includes a push-in operation portion 51, a CPA main body 52 and two arms 53 that extend frontward from the push-in operation portion 51, and a restricting projection 54 that protrudes from the CPA main body 52.

The CPA main body 52 has an elongated plate shape overall, and the portion thereof adjacent to the push-in operation portion 51 is a CPA base portion 52A, and the portion thereof on the distal end side relative to the CPA base portion 52A is a bending portion 52B that is thinner than the CPA base portion 52A and is allowed to undergo a bending deformation. The two arms 53 have thick plate shapes and are arranged on both sides of the CPA main body 52 so as to face each other. The restricting projection 54 protrudes from the distal end of the bending portion 52B. A portion of the outer surface of the CPA base 52A is a second code arrangement surface 55.

The CPA member 50 includes two guide ribs 56 and two locking projections 57 that respectively protrude outward from the two arms 53. The guide ribs 56 are strip-shaped protrusions extending in the front-rear direction. The locking projections 57 are projections extending along the front edges of the arms 53.

When the CPA member 50 is attached to the CPA holding portion 31, most of the CPA main body 52 is inserted into the receiving tube portion 24, and the bending portion 52B is arranged between the two lock side walls 25. The two arms 53 are respectively arranged between the two protective side walls 32 and the lock arm 21. The CPA member 50 can be displaced between a standby position (the position shown in FIGS. 1, 3, 10, and 12: an example of a first position) and a fitting assurance position (the position shown in FIG. 14: an example of a second position).

Two-Dimensional Codes 60A, 60B, 60C

A first two-dimensional code 60A (an example of a first identifier) and a second two-dimensional code 60B (an example of a second identifier) are respectively arranged on the first code arrangement surface 26A and the second code arrangement surface 55. The two two-dimensional codes 60A and 60B can be formed, for example, by laser printing on the outer surfaces of the code placement surfaces 26A and 55. Both of the first two-dimensional code 60A and the second two-dimensional code 60B are entirely visible from the outside, both when the CPA member 50 is in the standby position and when the CPA member 50 is in the fitting assurance position.

Partner Connector 70

Figure 10:
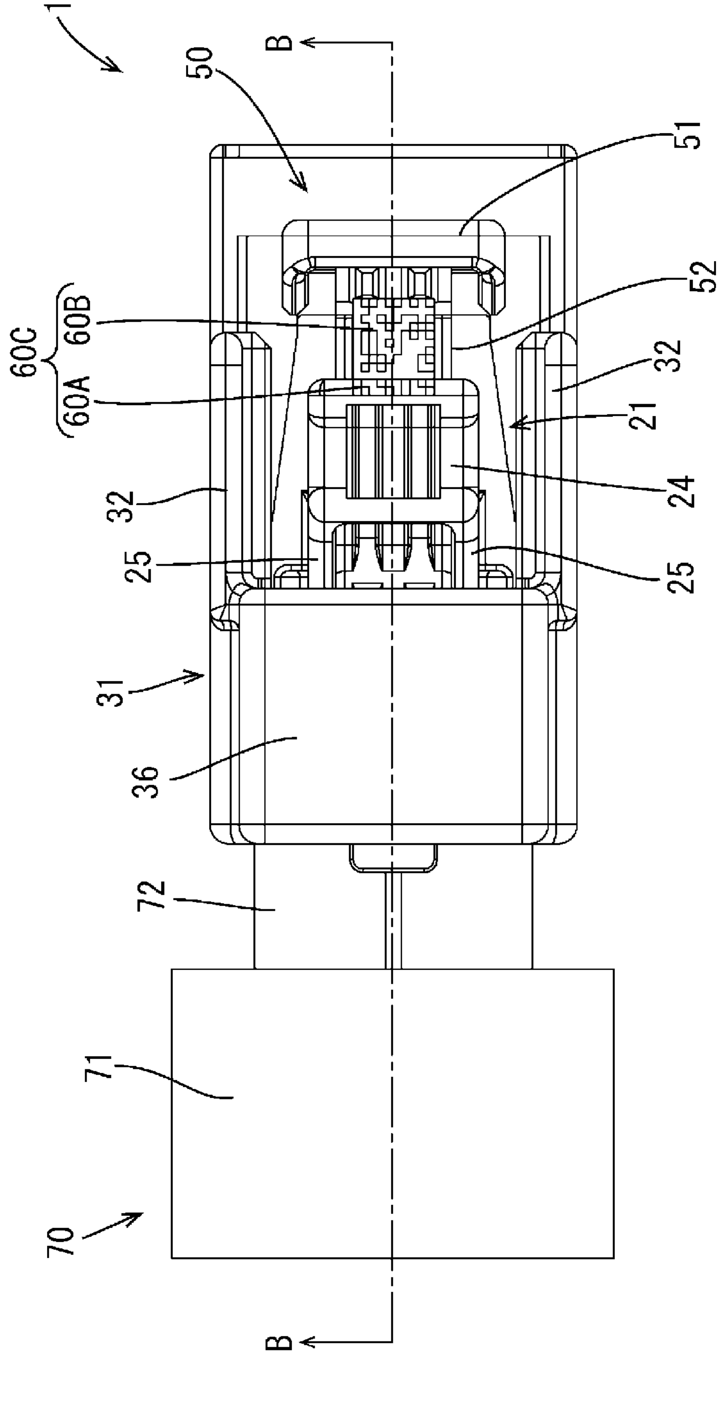
FIG. 10 is a plan view showing an initial state of fitting between the connector and a partner connector according to the embodiment.

As shown in FIGS. 10 and 11, the partner connector 70 includes a block-shaped terminal holding portion 71 that holds male terminal fittings T2 to be connected to the female terminal fittings T1, a tube-shaped partner hood portion 72 extending from the terminal holding portion 71, and a lock protrusion 73 protruding from the outer peripheral surface of the partner hood portion 72.

Fitting of Connector 1 and Partner Connector 70

Figure 4:
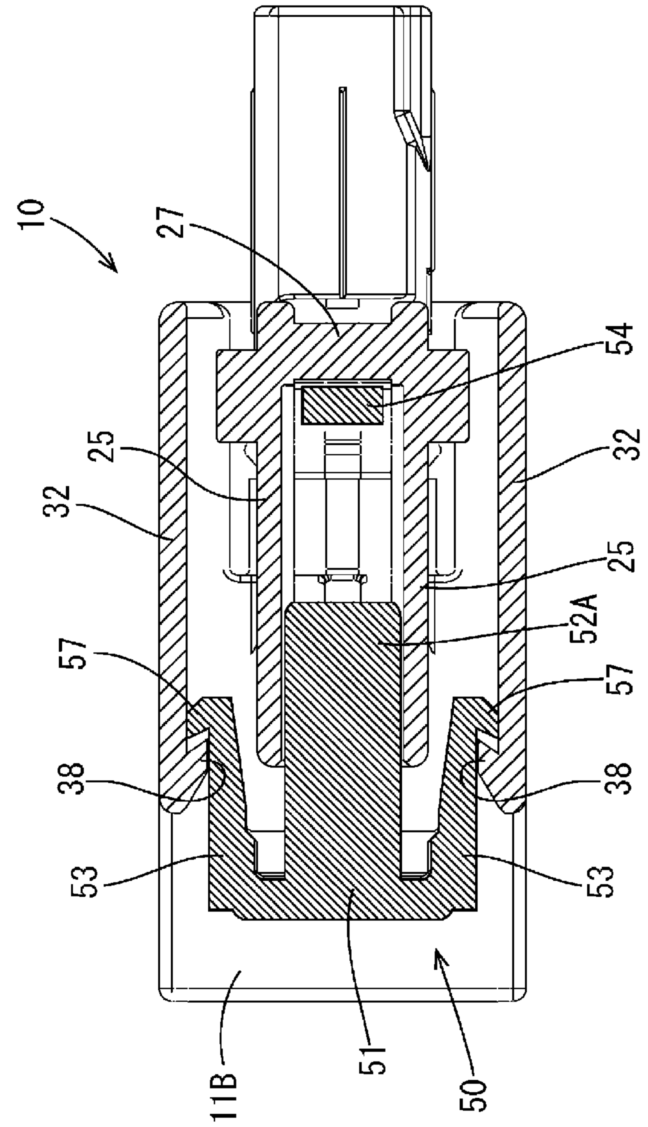
FIG. 4 is a cross-sectional view taken along line A-A in FIG. 3.

When the housing 10 is not fitted together with the partner connector 70, the CPA member 50 is held at the standby position, and the entire push-in operation portion 51 and the portions of the CPA main body 52 and the arms 53 that are adjacent to the push-in operation portion 51 protrude rearward from the rear end of the CPA holding portion 31. As shown in FIG. 4, the locking projections 57 engage with the holding protrusions 38 to restrict the CPA member 50 from protruding beyond a certain level from the CPA holding portion 31, and restrict the CPA member 50 from falling out of the CPA holding portion 31. As shown in FIG. 11, the restricting projection 54 engages with the locking portion 27 to restrict the CPA member 50 from moving to the fitting assurance position.

Figure 13:
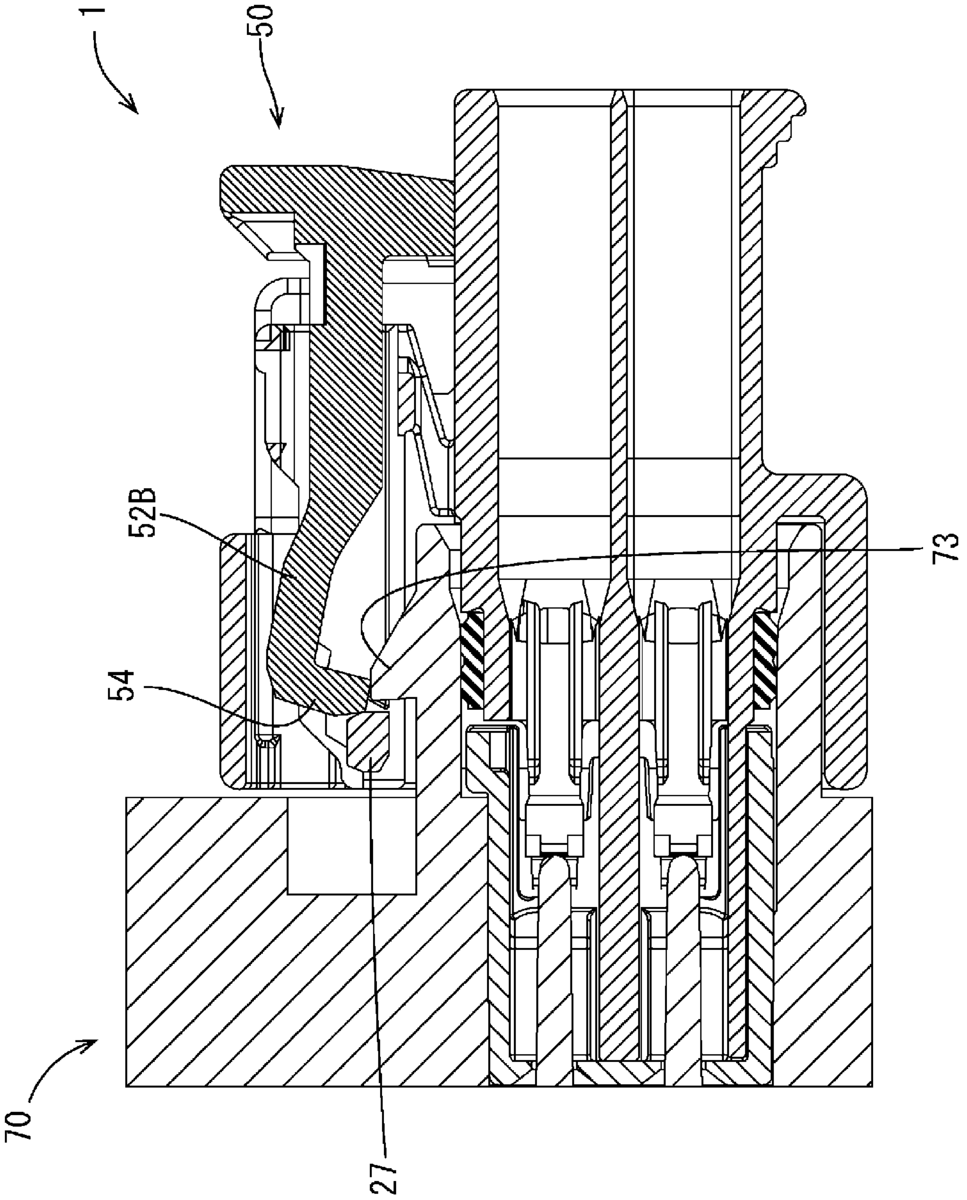
FIG. 13 is a cross-sectional view taken along line C-C in FIG. 12.

When the housing 10 is fitted together with the partner connector 70, as shown in FIG. 11, the terminal accommodation portion 11 enters inside the partner hood portion 72 and the partner hood portion 72 enters inside the hood portion 13. When the housing 10 approaches the fitting completion position with respect to the partner connector 70, the locking portion 27 is pushed by the lock protrusion 73, causing the lock arm 21 to bend in a direction away from the terminal accommodation portion 11. When the housing 10 reaches the proper fitting completion position with respect to the partner connector 70, the locking portion 27 moves past the lock protrusion 73 and moves frontward of the lock protrusion 73, as shown in FIG. 13, and the lock arm 21 returns elastically. Due to the locking portion 27 engaging with the lock protrusion 73, the housing 10 is held in the fitting completion position with respect to the partner connector 70.

When the housing 10 reaches the fitting completion position, the restricting projection 54 rides up on the locking protrusion 73, as shown in FIG. 13, and the bending portion 52B bends in the direction away from the terminal holding portion 71. As a result, the restricting projection 54 can move past the locking portion 27, and the CPA member 50 is allowed to move from the standby position to the fitting assurance position. On the other hand, if the housing 10 has not reached the proper fitting completion position with respect to the partner connector 70, as shown in FIG. 11, the locking portion 27 interferes with the restricting projection 54 and movement to the fitting assurance position of the CPA member 50 is restricted. In this manner, it is possible to determine whether or not the housing 10 has reached the proper fitting completion position with respect to the partner connector 70, depending on whether or not the CPA member 50 can be pushed in to the fitting assurance position.

Figure 16:
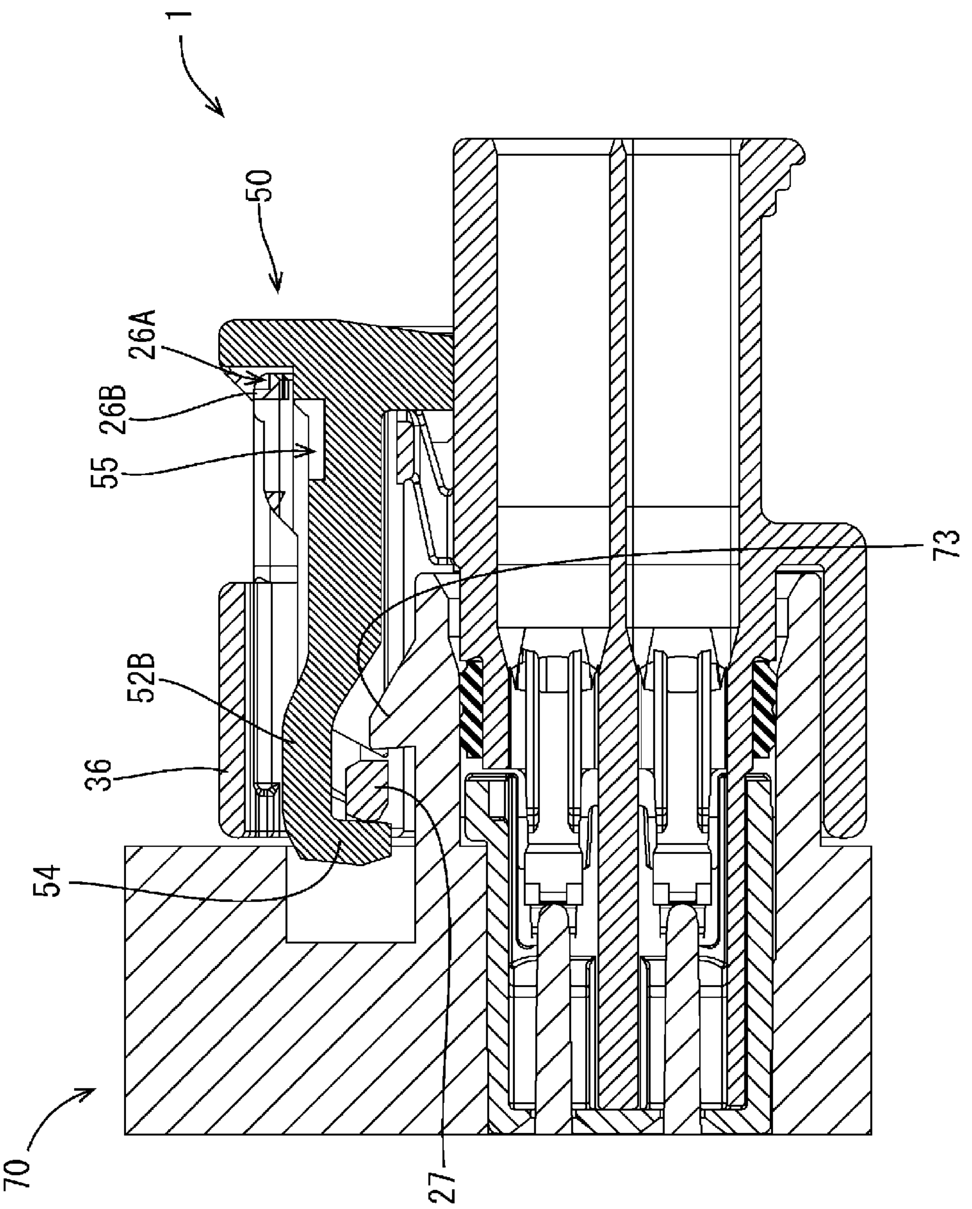
FIG. 16 is a cross-sectional view taken along line D-D in FIG. 14.

After the housing 10 reaches the fitting completion position, the CPA member 50 is pushed from the standby position to the fitting assurance position. When the CPA member 50 reaches the fitting assurance position, as shown in FIG. 16, the restricting projection 54 moves frontward past the locking portion 27, and the CPA main body 52 elastically returns. Due to the restricting projection 54 engaging with the locking portion 27, the CPA member 50 is restricted from moving to the standby position and is held at the fitting assurance position. When the CPA member 50 is in the fitting assurance position, almost the entirety thereof is accommodated in the CPA holding portion 31.

Reading Two-Dimensional Codes 60A and 60B

When the CPA member 50 is in the standby position, as shown in FIG. 10, the second code arrangement surface 55 is located adjacent to the rear side of the receiving tube portion 24, and the first code arrangement surface 26A and the second code arrangement surface 55 are adjacent to each other. In this state, the first two-dimensional code 60A and the second two-dimensional code 60B are disposed adjacent to each other and combine to form one composite two-dimensional code 60C (an example of a composite identifier). As shown in FIG. 11, the first code arrangement surface 26A and the second code arrangement surface 55 do not need to be flush with each other, and may have some height difference from each other. The composite two-dimensional code 60C formed by combining the two two-dimensional codes 60A and 60B includes information different from the information contained in the single second two-dimensional code 60B. In this embodiment, the composite two-dimensional code 60C includes information such as "fitting incomplete," for example. When this composite two-dimensional code 60C is read by the scanning device, it is determined that the fitting of the connector 1 and the partner connector 70 is not complete.

Figure 14:
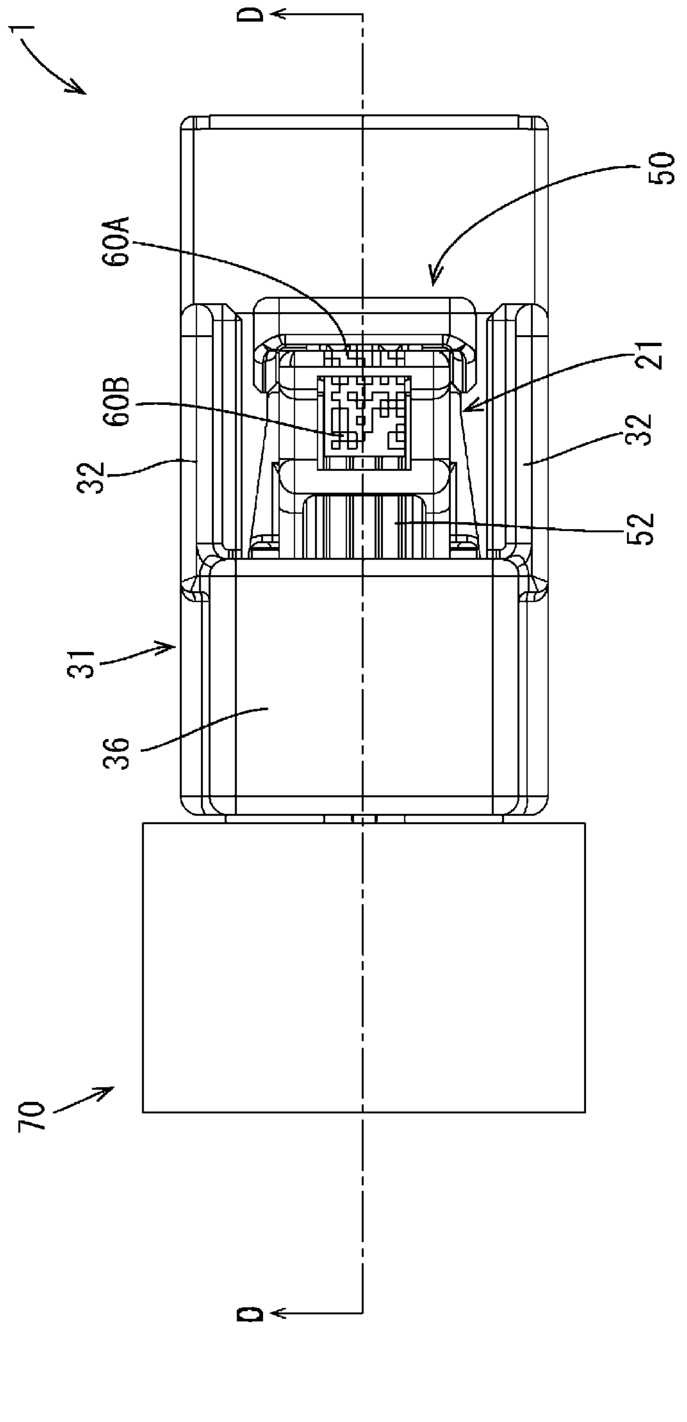
FIG. 14 is a plan view showing a state in which fitting between the connector and the partner connector according to the embodiment is complete and the CPA member is in a fitting assurance position.
Figure 15:
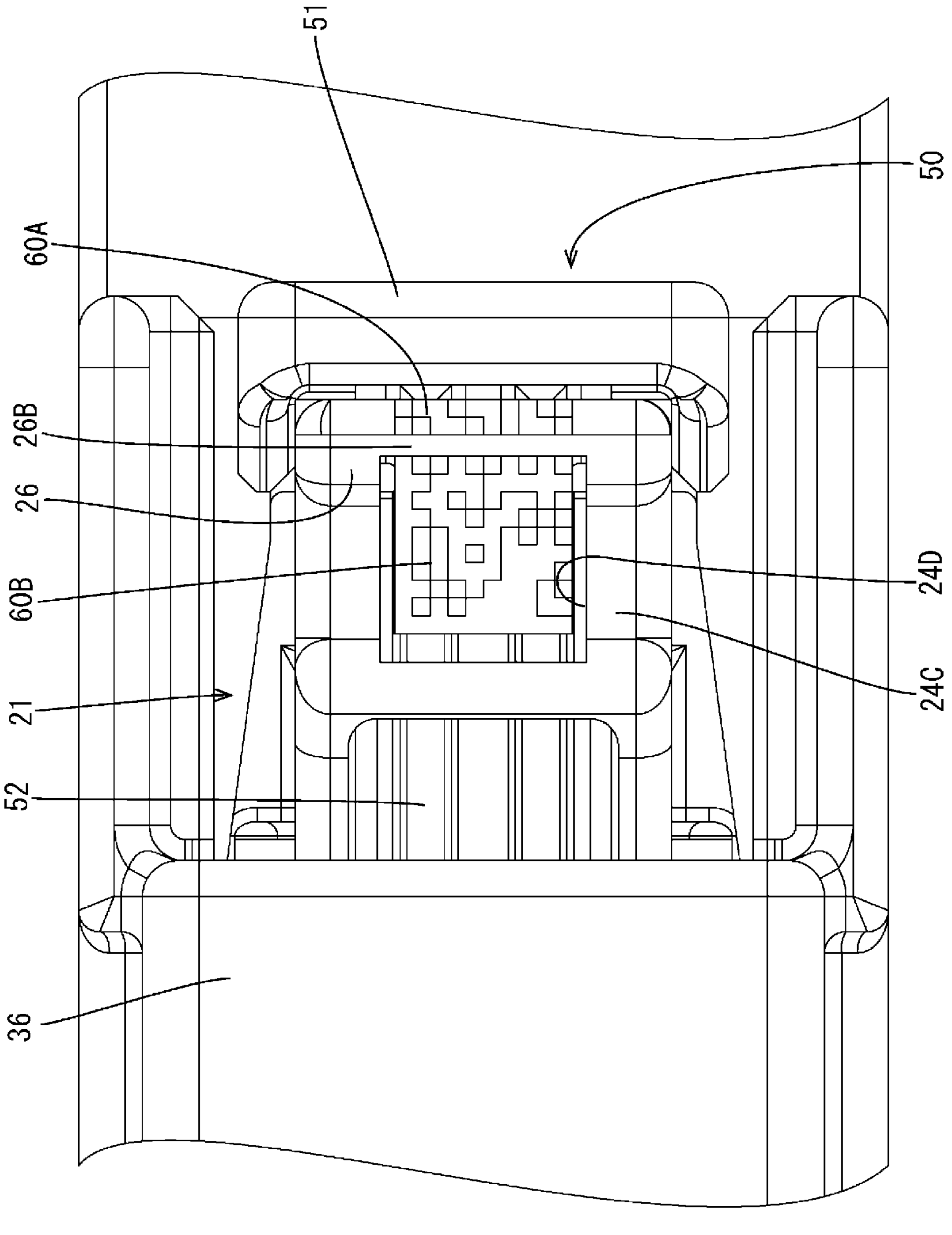
FIG. 15 shows a partial enlarged plan view showing a portion in a surrounding area of a first two-dimensional code and a second two-dimensional code in an enlarged manner, in a state where fitting between the connector and the partner connector according to the embodiment is complete and the CPA member is in the fitting assurance position.

When the CPA member 50 is in the fitting assurance position, as shown in FIGS. 14 and 15, the portion of the CPA main body 52 where the second code arrangement surface 55 is disposed enters inside the receiving tube portion 24, and the second two-dimensional code 60B becomes visible through the viewing window 24D. The first two-dimensional code 60A and the second two-dimensional code 60B are disposed spaced apart from each other, and the separating portion 26B is disposed between the first two-dimensional code 60A and the second two-dimensional code 60B. That is, the first two-dimensional code 60A and the second two-dimensional code 60B are separated by the separating portion 26B. As a result, the first two-dimensional code 60A and the second two-dimensional code 60B do not combine with each other and each exists as a single code. The first two-dimensional code 60A alone does not contain any meaningful information, and the second two-dimensional code 60B alone, which is not combined with the first two-dimensional code 60A, may include, for example, information such as "fitting complete" or "lot number." When this second two-dimensional code 60B is read by a scanning device, it is determined that the fitting of the connector 1 and the partner connector 70 is complete, and the information included in the second two-dimensional code 60B is recorded in the recording device.

Operation and Effects

As described above, according to the present embodiment, the connector 1 includes the housing 10 that can fit together with the partner connector 70, the CPA member 50 that is to be attached to the housing 10 and can be displaced between the standby position and the fitting assurance position, the first two-dimensional code 60A arranged so as to be visible on the outer surface of the housing 10, and the second two-dimensional code 60B arranged so as to be visible on the outer surface of the CPA member 50, and when the CPA member 50 is in the standby position, the first two-dimensional code 60A and the second two-dimensional code 60B combine to form a composite two-dimensional code 60C, and when the CPA member 50 is in the fitting assurance position, the first two-dimensional code 60A and the second two-dimensional code 60B are separated from each other.

According to the above configuration, the CPA member 50 is attached to the housing 10 in the standby position, and after the housing 10 is fitted together with the partner connector 70, the CPA member 50 can be displaced to the fitting assurance position with respect to the housing 10. When the CPA member 50 is in the standby position, the two two-dimensional codes 60A and 60B combine to form a composite two-dimensional code 60C. When the CPA member 50 is in the fitting assurance position, the first two-dimensional code 60A and the second two-dimensional code 60B are separated from each other, and the composite two-dimensional code 60C is not formed. As a result, when the composite two-dimensional code 60C is read by the reading device, it is not detected that the fitting of the housing 10 together with the partner connector 70 is complete, and when the second two-dimensional code 60B that is separated from the first two-dimensional code 60A is read by the reading device, it is possible to detect and record that the fitting of the housing 10 together with the partner connector 70 is complete. Also, since the first two-dimensional code 60A and the second two-dimensional code 60B are arranged so as to be visible, a worker can perform work while visually confirming these two-dimensional codes 60A and 60B. As described above, it is possible to both reliably detect the completion of fitting together with the partner connector 70 and improve work efficiency.

Also, the CPA member 50 can be displaced from the standby position to the fitting assurance position only when the housing 10 is completely fitted together with the partner connector 70.

According to such a configuration, by being able to move the CPA member 50 from the standby position to the fitting assurance position, it is possible to assure that the fitting is complete.

Also, the housing 10 includes the separating portion 26B that separates the first two-dimensional code 60A and the second two-dimensional code 60B when the CPA member 50 is in the standby position.

According to this configuration, when the CPA member 50 is in the standby position, the first two-dimensional code 60A and the second two-dimensional code 60B are reliably separated from each other, and therefore it is possible to reliably avoid a situation where the two two-dimensional codes 60A and 60B are mistakenly recognized as being combined even though the CPA member 50 is not in the fitting assurance position.

Other Embodiments (1) In the above-described embodiment, the identifiers are the two-dimensional codes 60A and 60B, but the identifiers may also be, for example, one-dimensional codes such as bar codes, letters, numbers, designs, recesses and protrusions, or a combination thereof.

(2) In the above-described embodiment, the first two-dimensional code 60A is disposed on the lock arm 21, but the arrangement position of the first identifier is not limited to the above-described embodiment, and for example, the first identifier may also be disposed on the CPA holding portion.

(3) In the above-described embodiment, the separating portion 26B is disposed on the lock arm 21, but the arrangement position of the separating portion is not limited to the above-described embodiment, and may be, for example, an attachment member.

(4) In the above-described embodiment, when the CPA member 50 is in the standby position, the two two-dimensional codes 60A and 60B combine to form the composite two-dimensional code 60C. When the CPA member 50 is in the fitting assurance position, the first two-dimensional code 60A and the second two-dimensional code 60B are separated from each other, and when the single second two-dimensional code 60B that is separated from the first two-dimensional code 60A is read by the reading device, it is detected that the fitting of the housing 10 together with the partner connector 70 is complete, but for example, when the attachment member is in the first position, the two identifiers may be separated from each other, and when the attachment member is in the second position, the two identifiers may combine to form a composite identifier.

LIST OF REFERENCE NUMERALS

1 Connector
10 Housing
11 Terminal accommodation portion
11A Accommodation portion main body
11B Holding wall
12 Cavity
13 Hood portion
14 Back wall
15 Peripheral wall
15A Hood side wall
15B Hood bottom wall
16 Fitting port
21 Lock arm
22 Lock base portion
23 Lock main body
24 Receiving tube portion
24A Receiving bottom wall
24B Receiving side wall
24C Receiving top wall
24D Viewing window
25 Lock side wall
26 Lock operation portion
26A First code arrangement surface
26B Separating portion
27 Locking portion
28 Bending restricting piece
30 Lock arm
31 CPA holding portion
32 Protective side wall
33 Connecting wall
34 Stepped portion
35 Upright wall
36 Protective top wall
37 Bending restricting protrusion
38 Holding protrusion
39 Side rib
40 Front holder
50 CPA member (attachment member, fitting assurance member)
51 Push-in operation portion
52 CPA main body
52A CPA base portion
52B Bending portion
53 Arm
54 Restricting projection
55 Second code arrangement surface
56 Guide rib
57 Locking projection
60A First two-dimensional code (first identifier)
60B Second two-dimensional code (second identifier)
60C Composite two-dimensional code (composite identifier)
70 Partner connector
71 Terminal holding portion
72 Partner hood portion
73 Lock protrusion
T1 Female terminal fitting
T2 Male terminal fitting

What is claimed is:

1. A connector comprising:

a housing capable of fitting together with a partner connector;

an attachment member that is to be attached to the housing and is capable of being displaced between a first position and a second position;

a first identifier arranged so as to be visible on an outer surface of the housing; and a second identifier arranged so as to be visible on an outer surface of the attachment member, wherein when the attachment member is in one of the first position and the second position, the first identifier and the second identifier combine to form a composite identifier, and when the attachment member is in another of the first position and the second position, the first identifier and the second identifier are separated from each other, the housing includes a receiving tube portion capable of accommodating at least a portion of the attachment member, the receiving tube portion includes the first identifier, a separating portion, and a viewing window through which the second identifier is visible when the attachment member is in the other of the first position and the second position, the separating portion is disposed between the first identifier and the viewing window to physically separate the first identifier from the second identifier when the attachment member is in the other of the first position and the second position, and the composite identifier includes information different from information included in the second identifier.

2. The connector according to claim 1, wherein the attachment member is a fitting assurance member capable of being displaced from the first position to the second position only when the housing is completely fitted together with the partner connector.

3. The connector according to claim 1, wherein the receiving tube portion is configured to surround the second identifier to prevent the second identifier from being visible from an outside except through the viewing window when the attachment member is in the other of the first position and the second position.

4. The connector according to claim 1, wherein the information included in the composite identifier is “fitting incomplete,” and the information included in the second identifier is “fitting complete”.

* * * * *